United States Patent
Killick

(10) Patent No.: US 10,003,849 B1
(45) Date of Patent: Jun. 19, 2018

(54) PERSONALIZED VIDEO ON DEMAND CHANNELS

(71) Applicant: Cox Communications, Inc., Atlanta, GA (US)

(72) Inventor: Ray Killick, Alpharetta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days. days.

(21) Appl. No.: 15/184,766

(22) Filed: Jun. 16, 2016

(51) Int. Cl.
*H04N 7/173* (2011.01)
*H04N 21/45* (2011.01)
*H04N 21/482* (2011.01)
*H04N 21/472* (2011.01)
*H04N 21/2381* (2011.01)
*H04N 21/262* (2011.01)

(52) U.S. Cl.
CPC ..... *H04N 21/4532* (2013.01); *H04N 21/2381* (2013.01); *H04N 21/26258* (2013.01); *H04N 21/47202* (2013.01); *H04N 21/47217* (2013.01); *H04N 21/482* (2013.01)

(58) Field of Classification Search
CPC combination set(s) only.
See application file for complete search history.

(56) References Cited

U.S. PATENT DOCUMENTS

| | | | |
|---|---|---|---|
| 2005/0018691 A1* | 1/2005 | Riedl | H04L 29/06027 370/395.42 |
| 2009/0165036 A1* | 6/2009 | Berry | G06F 17/30817 725/32 |
| 2012/0072543 A1* | 3/2012 | Kalmanje | H04L 12/00 709/219 |
| 2014/0359669 A1* | 12/2014 | Lemus | H04N 21/47202 725/41 |
| 2015/0020105 A1* | 1/2015 | Roberts | G11B 27/28 725/44 |

* cited by examiner

*Primary Examiner* — Mulugeta Mengesha
(74) *Attorney, Agent, or Firm* — Merchant & Gould

(57) ABSTRACT

Video on Demand (VOD) content is enjoyed by consumers, but its selection and delivery is often tedious for consumers and uses large amounts of bandwidth for service providers. By providing VOD channels that consumers may freely navigate, service providers not only improve the user experience for consumers, but may reduce the bandwidth needed to request and send navigation commands. VOD channels provide VOD content to consumers according to criteria and preferences set by the consumer, and allow navigation within a VOD channel, between separate VOD channels, and between menus and linear channels. Channel guides and viewing features are tailored for VOD channels to further improve the user experience.

20 Claims, 7 Drawing Sheets

Fig. 4

PERSONALIZED VIDEO ON DEMAND CHANNELS

BACKGROUND

Consumers of television services greatly enjoy video on demand (VOD) content, which enables consumers to request specific content items from a service provider's or third party's catalog to view at the time of the consumer's choosing. As service providers and third parties have learned of consumer desire for VOD content, their catalogs of VOD content have grown, but the systems and methods for consumers to choose content have remained stagnant. Consumers are presented with an overabundance of choice for VOD content and lack a simple and effective way for this content to be presented to them, leading to long times navigating unresponsive interfaces and, ultimately, consumer frustration.

SUMMARY

Aspects of the present disclosure provide for systems and methods to provide consumers with access to easily navigable Video on Demand (VOD) content. In addition to traditional menu based navigation methods, the service provider offers the consumers the ability to create VOD channels. VOD channels are freely navigable by the consumer, like broadcast channels, such that the consumer may change between VOD channels and broadcast channels to receive the content carried by those channels. The content carried by broadcast channels is set by various television stations and is delivered as linear content. The content carried by VOD channels is set by a consumer's preferences to present the consumer with desired content at the desired time, but without the frustration involved in manually building a playlist or navigating a menu.

Consumers viewing content on VOD channels are provided with trick play operation (rewind, fast forward, pause, skip, etc.), and can set preferences for what content is on each VOD channel, and how many VOD channels are available for navigation. VOD channels are navigable via channel change commands (e.g., channel up, tune to channel), and may be mutually or separately navigable from broadcast channels. Similarly, a consumer may navigate the VOD channels via a VOD electronic programming guide (EPG), which may be incorporated into the linear EPG for the broadcast channels, or separated from the linear EPG.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIG. 4 is a block diagram illustrating an example Electronic Programming Guide navigation architecture for linear and Video On Demand channels;

DETAILED DESCRIPTION

As briefly described above, aspects of the present disclosure provide for systems and methods to provide consumers with access to easily navigable Video on Demand (VOD) content. In addition to traditional menu based navigation methods, the service provider offers the consumers the ability to create VOD channels. VOD channels are freely navigable by the consumer, like broadcast channels, such that the consumer may change between VOD channels and broadcast channels to receive the content carried by those channels. The content carried by broadcast channels is set by various television stations and is delivered as linear content. The content carried by VOD channels is set by a consumer's preferences, to provide the consumer with desired content at the desired time, but without the frustration involved in manually building a playlist or navigating a menu.

Consumers viewing content on VOD channels are provided with trick play operation (rewind, fast forward, pause, skip, etc.), and can set preferences for what content is on each VOD channel, and how may VOD channels are available for navigation. VOD channels are navigable via channel change commands (e.g., channel up, tune to channel), and may be mutually or separately navigable from broadcast channels. Similarly, a consumer may navigate the VOD channels via a VOD electronic programming guide (EPG), which may be incorporated into the linear EPG for the broadcast channels, or separated from the linear EPG.

By providing the consumer with channels of customized VOD content, the service provider not only improves the user experience for consumers by reducing the amount of time it takes to receive desired content, the service provider may reduce congestion over its network by reducing the number of requests sent over its network and the amount of content received by consumers that will go unwatched. These and other advantages will become clear to one of ordinary skill in the art upon reading the present disclosure and the incorporated figures.

Figure 1:
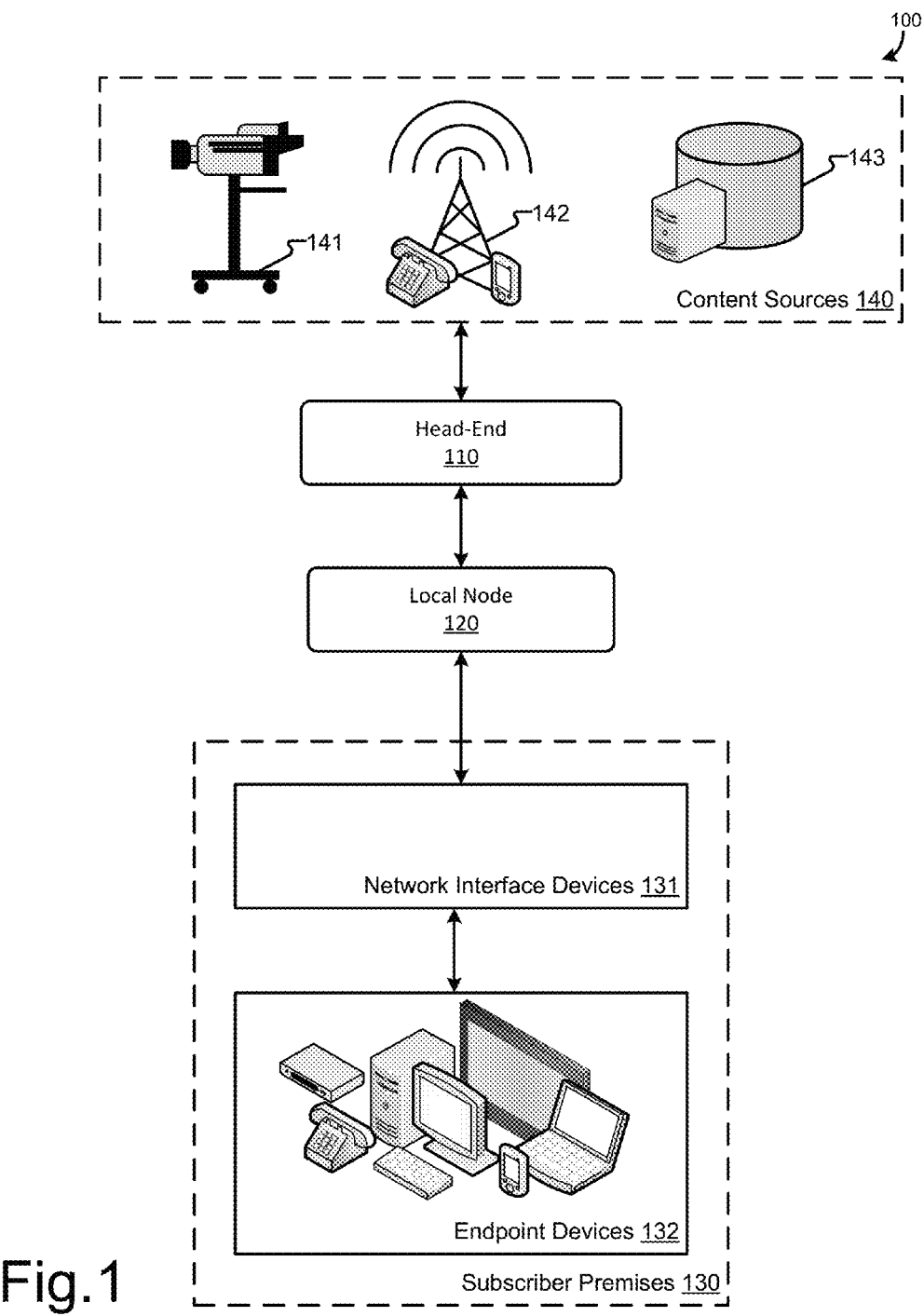
FIG. 1 illustrates an example Content Delivery Network with which the present disclosure may be practiced.

FIG. 1 illustrates an example Content Delivery Network (CDN) 100 with which the present disclosure may be practiced. Services originate at a head-end 110, which distributes services to local nodes 120, which in turn serve subscriber premises 130. The CDN 100 provides tiers of caching and processing from which data are requested and transmitted over a physical network (which may include wired and wireless components), enabling the distribution of data and services for quick access by consumers at lower levels of the tier from higher levels of the tier where the content originates. Content may remain cached at a given tier in the CDN 100 according to a Time to Live (TTL) value associated with the content and/or the tier (e.g., 6, 12, 24 hours), such that the content will expire according to the TTL value so that the CDN 100 may reclaim the memory used to cache the expired content item to cache a different content item. Services include, but are not limited to cable television service, internet service, and telephone service, and one consumer may be provided with one or more services by the service provider over CDN 100.

The CDN 100 illustrated in FIG. 1 in various aspects uses a Hybrid Fiber-Coaxial (HFC) network as its physical network to link subscriber premises 130 with content sources 140 to provide content. The head-end 110 is in communication with the local node 120 via fiber optic cables, and the local node 120 is in communication with the subscriber premises 130 via fiber optic cables (when fiber to the premises (FTTP) is installed), coaxial cables, or telephone lines. Because subscriber premises 130 are typically wired with coaxial cable, even an FTTP network may be considered to be an HFC network.

In other aspects, the head-end 110 may be in communication with the content sources via various transmission media, including, but not limited to, fiber optic cables, coaxial cables, telephone lines, and radio waves. Content sources 140 include television stations 141, telephone networks 142, and content databases 143. Television stations 141 include local broadcast stations, cable network stations, and satellite network stations. Telephone networks 142 include wireless networks, such as mobile phone cells in a cellular telephone network, as well as wired networks, such the trunk lines between cell towers and/or telephone exchanges. Content databases 143 include local content databases, such as the servers used by the service provider to store and provide VOD content, and remote content databases, such as those provided via the Internet or by other service providers.

Although, for purposes of simplicity, only one local node 120 and one subscriber premises 130 are illustrated in FIG. 1, one of ordinary skill in the art will understand that a head-end 110 may be in communication with multiple local nodes 120 and each local node 120 may be in communication with multiple subscriber premises 130. One of ordinary skill in the art will also recognize that a head-end 110 may be implemented in a single office or facility, or in a ring of multiple offices or facilities that act as distributed hubs of the head-end 110, which may be in communication with each other via fiber optic cables or radio waves, such as, for example, microwave transmissions.

At the subscriber premises 130, services are received from the local node 120 by network interface devices 131, such as, for example, cable modems, set top boxes (STB), cable cards, and Voice over Internet Protocol (VoIP) telephone interfaces. A network interface device 131 interfaces between the local node 120 and endpoint devices 132, and may convert signals comprising the services from one transmission medium to another transmission medium (e.g., between coaxial cable, Ethernet cable (category-6, category-6e, etc.), telephone cable (RJ11, RJ14, etc.), and radio waves), translate signals between encapsulation modes (e.g., shift signals to heterodynes, change signal standards, change modulation schemes), cache or buffer data for burst transmission, apply forward error correction, and route signals to the appropriate endpoint devices 132.

Endpoint devices 132 are devices used by consumers to consume content delivered via the CDN 100, such as, for example, televisions, Digital Video Recorders (DVR), computers (including desktops, laptops, tablets, netbooks, personal media servers, video game systems, etc.), landline phones (e.g., VoIP consoles, Plain Old Telephone Service (POTS) consoles), mobile phones, fax machines, networked printers, internet radios receivers, etc. In various aspects, endpoint devices 132 may incorporate network interface devices 131, such as, for example, a combination STB and DVR.

Commands from a consumer may be sent to the network interface devices 131 or the endpoint devices 132 via integrated controls (e.g., buttons, switches, knobs, and touch screens), wired devices in communication with the device (e.g., wired keyboards, mice, and console controllers), and wireless control devices in communication with the device (e.g., remote controls, wireless keyboards, mice, and console controllers). In various aspects, wireless control devices may be associated with one network interface device 131 or endpoint device 132, or may be associated with multiple network interface devices 131 and/or endpoint devices 132 (e.g., a universal remote control) serially or simultaneously in communication with multiple devices.

Television services delivered over the physical network may multiplex several different content items for concurrent transmission over shared transmission media. In a radio frequency television (RFTV) implementation, each television station 141 is assigned a frequency or wavelength on which its content is transmitted, whereas in an internet protocol television (IPTV) implementation, each subscriber premises 130 is assigned a frequency or wavelength on which content specific to that subscriber premises 130 is delivered. As will be understood, when a consumer changes channels under RFTV, a tuner in a network interface device 131 or an endpoint device 132 changes the frequency to which it is tuned, whereas when a consumer changes channels under IPTV, a request is sent to the local node 120 or head-end 110 to encapsulate the content of the newly requested channel in a stream of internet protocol (IP) packets that are delivered to the consumer. In an IPTV implementation, due to the distance between the consumer and the service provider, navigation requests (of menus or of content) may introduce lag or delays from the time of request to the time of delivery for content requested by a consumer.

As one of ordinary skill in the art will understand, the CDN 100 will include various computer devices, which are used to manage and control how content is cached for the provision of services to consumers. For example, when a consumer requests a content item, the CDN 100 will check for the content item in the cache of the node lowest in the tier (and closest to the consumer) and will check progressively higher in the tiers (up to an origin content store) for a cached version of that content item until it is retrieved and distributed through the tiers of the CDN 100 and the consumer. Computers used in the CDN 100 include processors and memory storage devices, which store instructions that when executed by the processors enable the caching and retrieval of content for the provision of services. Memory storage devices are articles of manufacture that include computer-readable storage media. The term computer-readable storage media does not include transmission media, but refers to hardware media used to store desired information for access by a computer. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

Figure 2:
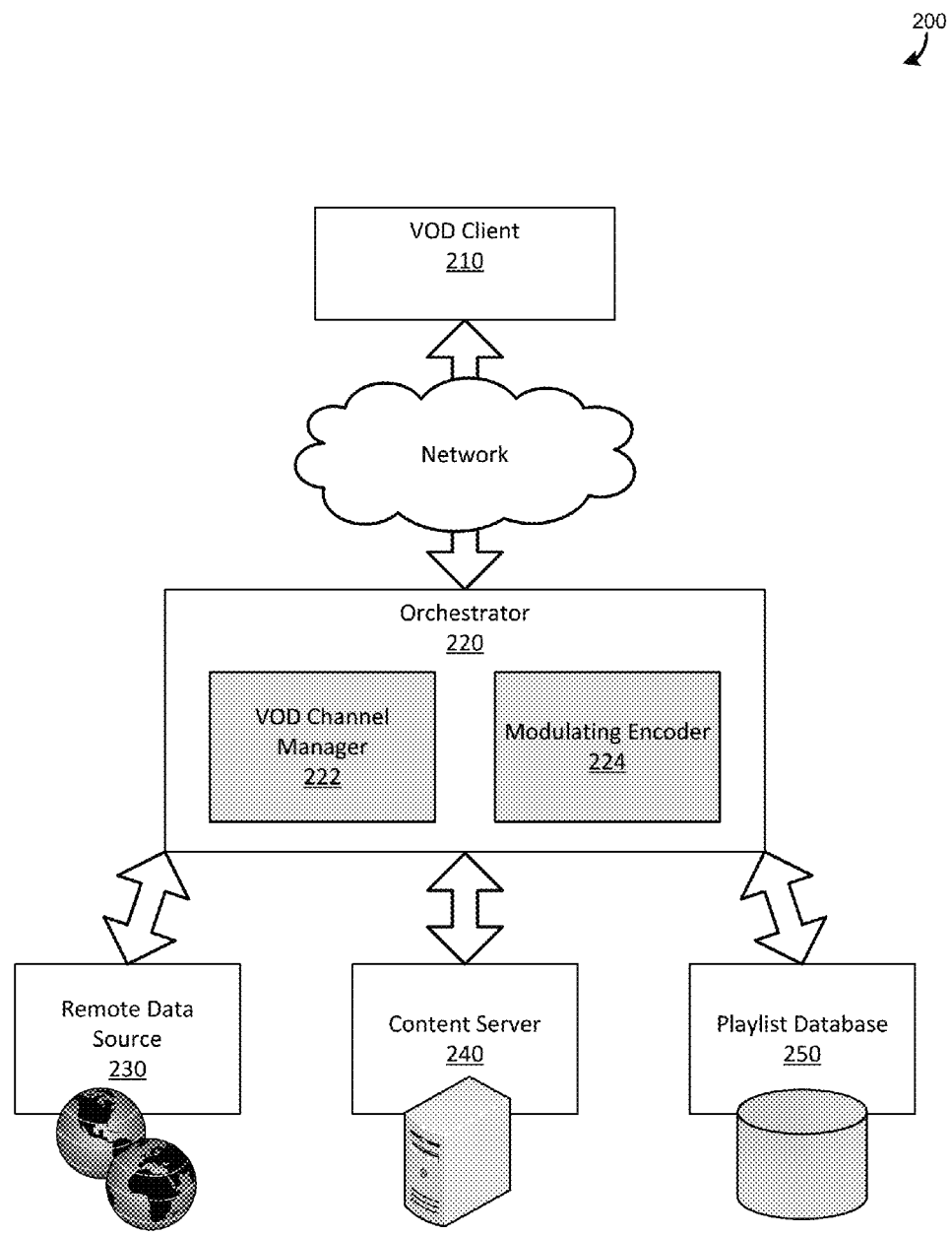
FIG. 2 illustrates an example block diagram of a Video On Demand channel system.

FIG. 2 illustrates an example block diagram of a VOD channel system 200. VOD content is delivered via a physical network (which may include a CDN 100, such as that illustrated in FIG. 1), to a VOD client 210. The VOD client 210 is operable to receive VOD content and make requests for access to VOD content. The requests are handled via the network by an orchestrator 220, which accesses remote data sources 230, content servers 240, and playlist databases 250 to provide consumers with access to VOD channels with desired VOD content. The VOD channel system 200 thus is operable to provide a consumer with access to VOD content via freely navigable channels that are consumer-defined and service-provider populated.

The VOD client 210 is a portal by which a consumer receives, requests, and sets up VOD channels. In various aspects, the VOD client 210 is a software application that is executed on a network interface device 131 or an endpoint device 132 local to the consumer. For example, the VOD client 210 may be stored in a memory storage device associated with an STB, and when executed by the STB, such as when the consumer signals for the VOD client 210 to be executed via a command sent from a wireless control device, so that the VOD client 210 displays on a television in communication with the STB.

In various aspects, a consumer may request a VOD channel via directional navigation commands, tune-to commands, and EPG navigation commands. Directional navigation commands (e.g., channel up, channel down) requests a VOD channel based on the currently selected VOD channel, whereas tune-to commands (e.g., tune-to channel two, tune to PBS) request a specific channel. A more detailed discussion of directional navigation commands is presented with respect to FIG. 3. EPG navigation commands enable a consumer to select a VOD channel from the VOD channels listed in an EPG. A more detailed discussion of EPG navigation commands is presented with respect to FIG. 4. Additionally, individual VOD content items may be selected for playback from the EPG or from a VOD menu.

When a consumer requests to navigate to a VOD channel, the VOD client 210 transmits the request to the orchestrator 220 via the network, which may cache the content for provision via the CDN 100. The request indicates which consumer made the request and indicates the VOD channel requested. The orchestrator 220 uses a VOD channel manager 222 to retrieve a playlist and any associated bookmarks for the indicated VOD channel for the indicated consumer from a playlist database 250. A bookmark indicates which content item from the playlist is to be provided to the consumer and where provision of that content item is to begin.

For example, a bookmark may indicate a given content item that is one hour long is to be delivered to the consumer, but that the consumer has viewed thirty minutes of that content item, therefore the hour-long content item should be provided to the consumer from the last-viewed time of the program (e.g., thirty minutes into the content item) and not from the beginning. In another example, when a consumer is sending navigation commands to switch back and forth between two (or more) VOD channels, each VOD channel maintains a separate VOD content bookmark, so that when the orchestrator 220 actively provides content from the second VOD channel, the consumer will be able to resume watching the VOD content item from the first VOD channel from when the consumer switched to the second VOD channel according to the first VOD channel's VOD bookmark. VOD content bookmarks enable a consumer to change channels without missing or skipping any of the VOD content when resuming playback for a given VOD content item.

VOD channels are set up via the VOD client 210 according to consumer selected criteria and preferences. For example, a consumer may select criteria indicating a genre (e.g., comedy, drama, edutainment), a sub-genre (e.g., science fiction, romantic, animated), a content type (e.g., movie, television program, news, sports), a participant (e.g., actor, director, producer, writer), a title or key word, a critical rating and rating source (e.g., at least four stars from the local newspaper, 80% Fresh from rottentomatoes.com), a content rating (e.g., rated R, rated TV-Y7, not rated, including a strong language modifier), etc., and whether to include or exclude content meeting those criteria from a given VOD channel. A consumer may also include preferences indicating how the content included on a VOD channel is to be delivered, including, but not limited to: a content resolution (e.g., 1080p, 720i, formatted for mobile devices), a frames per second (FPS) rate, an order of delivery (e.g., television series/movies with sequels are presented sequentially, by release date, randomly ordered), a retention policy (e.g., drop skipped content items from the VOD channel, drop watched items from the VOD channel, remove content items appearing in multiple VOD channels from all but one VOD channel), etc. Criteria are distinguishable from preferences in that criteria specify what content items are added to or excluded from a VOD channel, whereas preferences specify how or which version of the content item is to be added to a VOD channel and may include "soft" criteria that weight the criteria towards or against particular content items that meet the criteria. For example, a VOD channel with a preference against a particular actor may include content items that involve that actor, albeit less frequently than if no preference were set, but a VOD channel with a criterion against a that particular actor would not include any content items with metadata indicating that the actor was involved in that content item.

A consumer may set up a variable number of VOD channels with different criteria and preferences. For example, a consumer may set up a first VOD channel to request content with a comedy genre and setting no preferences for how that content is to be delivered. The same consumer may also set up a second VOD channel to request content of a movie type having a critical rating of at least four stars from the service provider's rating system with a preference for 1080p resolution at a minimum of thirty FPS. In various aspects, the consumer may also set a custom name for each VOD channel to easier recognition when navigating channels, for example, the consumer of the above examples may name the first VOD channel "ComedyMix," and the second VOD channel "Four Stars," which may be presented in the VOD client 210 as the consumer edits the VOD channels, in an EPG to navigate the VOD channels, and as an onscreen cue when the VOD channel is navigated to. The number of VOD channels available to the consumer may be limited by the service provider based on a subscription level of the consumer, a storage space cap on the network interface device 131 or endpoint device 132, or a storage space cap within the playlist database 250.

The criteria for VOD channels, and the relative orders thereof, may be set by the consumer via a VOD channel configuration manager having numerous different interfaces. In one example interface, the consumer may use a remote control to navigate setup menus provided on an endpoint device 132 or network interface device 131 used to consume television content. In various aspects, the user may use the buttons or a touchscreen of a remote control device or associated companion device (e.g., a tablet or smartphone in communication with the endpoint device 132 or network interface device 131) to navigate setup, while in other aspects the consumer may invoke a VOD channel configuration manager by a microphone and associated smart interpreter or digital assistant (e.g., CORTANA® (provided by Microsoft Corp., of Redmond, Wash.) or SIRI® (provided by Apple Inc., of Cupertino, Calif.)). In another example interface, the consumer may use a website or portal associated with a subscriber account or individual profile to invoke a VOD channel configuration manager via a web browser or an app for VOD channel setup.

The VOD channel, when navigated to by a consumer, provides the consumer with a stream of content items that meet the criteria and preferences set up by the consumer. When a content item presented on a given VOD channel concludes, a subsequent content item is presented on that channel, thus freeing the consumer from having to navigate a menu system to select a similar item. Similarly, when multiple VOD channels are set up by the consumer, the consumer can freely navigate between the VOD channels to receive content that meet various other criteria and preferences, further aiding the consumer to quickly and efficiently receive desired VOD content. Moreover, because the VOD content assigned to a VOD channel is ordered sequentially, the consumer may skip undesired content items on a VOD channel or return to them at a later time, thus enabling the consumer to browse content items that meet the same criteria and preferences.

The content in a given VOD channel may also be navigated by a consumer via the VOD client 210. For example, the consumer may perform trick play operations on a given content item such as, but not limited to: fast forward, rewind, jump x seconds ahead, jump x seconds back, pause, etc. The VOD client 210 will receive the commands for trick play operations from the consumer and communicate them to the orchestrator 220. The orchestrator 220 in conjunction with the VOD client 210 will begin provisioning content according to the trick play operation. As will be understood, depending on which trick play operation is selected and the amount of cached content available locally to the VOD client 210, the VOD client 210 may perform the trick play operation without first communicating the command to the orchestrator 220 or may wait to perform the command (or the subsequent playback of the content item) until additional content is provided by the orchestrator 220. For example, a VOD client 210 that caches forty-five seconds of a content item ahead of the current playback time may perform a first skip-ahead thirty seconds trick play operation before contacting the orchestrator 220, but will not perform a second skip-ahead thirty seconds trick play operation until it has received additional content from the orchestrator 220 that is sixty seconds ahead of the current playback time.

The orchestrator 220 will encapsulate the VOD content items according to the trick play command and will adjust the bookmark for the VOD content item accordingly to account for the trick play so that the orchestrator 220 can encapsulate the VOD content item from the adjusted bookmark to provide the VOD content item in trick play mode to the VOD client 210. For example, the orchestrator 220 may, in response to a jump x seconds ahead trick play command, adjust the time indicated by a bookmark ahead by x seconds. In another example, when a rewind at 2× speed trick play command is received, the orchestrator 220 will adjust the bookmark back in time within the VOD content item by two seconds for every one second that the trick play mode lasts. As will be appreciated, due to transmission delays between the orchestrator 220 and VOD client 210, the adjustment to the bookmark may take into account cache size of the VOD client 210 and transmission time between the orchestrator 220 and VOD client 210.

VOD channels are built by the VOD channel manager 222 based on criteria and preferences set by the consumer. VOD content items meeting the criteria and preferences are found in content server 240 and added to a playlist for the VOD channel. The VOD channel is assigned a name (e.g., VOD channel one) and its relationship to other VOD channels (e.g., is it navigable to or from VOD channel N via a "channel up" or "channel down" command) is set by the VOD channel manager 222 when the playlist is associated with a VOD channel. As will be understood, the consumer may rename the VOD channel, although this name is used only for display and navigation purposes for the consumer, and re-set the relationship of the VOD channel to other VOD channels. For example, VOD channel one may be renamed "Four Stars" and re-set as the second VOD channel in a block of VOD channels by the consumer, such that a consumer viewing VOD channel "Four Stars" may navigate to VOD channel three via a "channel up" command and to (now) VOD channel one via a "channel down" command. Accordingly, the consumer may navigate from VOD channel one to VOD channel "Four Stars" via a "channel up" command, from VOD channel three via a "channel down" command, or from any channel via a "tune to VOD channel two" or "tune to VOD channel 'Four Stars'" command.

The VOD channel manager 222 continually updates the playlists for VOD channels based on consumer-set criteria and preferences. As new content items become available, and as old content items become unavailable, the VOD channel manager 222 will add or remove content items from the playlist for a given VOD channel. Similarly, as a consumer edits the criteria and preferences that define which content items are placed onto a VOD channel, the VOD channel manager 222 will receive the criteria and preferences and adjust which content items are assigned to a given VOD channel by adding and removing content items according to the updated criteria and preferences. The VOD channel manager 222 compares metadata for the content items against the criteria using logical operators and comparators (e.g., greater than, less than, and, or, not) to determine whether a given content item matches the set criteria and preferences. The metadata may be stored in conjunction with the content item on a content server 240, or may be accessed via a remote data source 230. For example, the title of the content item may be stored in conjunction with the content item on a service provider's content server 240, while a critical rating of that content server may be stored on a remote data source 230, such as, for example, a newspaper's movie reviews column archives, that the orchestrator 220 accesses to retrieve the requested metadata to compare against a criteria or a preference. Remote data sources 230 include, but are not limited to: websites, databases, and servers operated by third parties to which the orchestrator is in communication.

When a content item has been skipped or consumed, the VOD channel manager 222 is operable to leave it on the playlist for the VOD channel, delete it from the playlist, or add it to a "watch again" playlist depending on the preferences. For example, parents may set preferences so that consumed content items are added to a "watch again" playlist so that the viewing habits of a child or a babysitter may be observed or so that the parents may watch the content items consumed in their absence. Similarly, preferences may dictate to the VOD channel manager whether to delete a VOD channel when all content items have been skipped or consumed, to start the playlist over, or to seek additional content items that meet the criteria for the VOD channel. As will be appreciated, given the strictness of criteria set for a VOD channel, the VOD channel manager 222 may encounter situations where no further content items can be found that meet the criteria. For example, a consumer may set criteria for "no repeats" and a title of a television show, such that when the consumer has viewed all the episodes of that television show, there are no other content items that can be presented to the consumer on that VOD channel using those criteria; the consumer has exhausted all potential content item choices. In such a case, the VOD channel manager 222 may delete the VOD channel or present a dialog on the VOD channel to the consumer indicating the exhaustion of the possible playlist, and recommending modifications to the criteria. For example, when the VOD channel for a particular television show is exhausted, the service provider may recommend a different television show via the dialog and provide a selectable object in the dialog for the consumer to select to alter the criteria for the given VOD channel to match the recommendation from the service provider. These recommendations may be based on the consumer's viewing history, the viewing histories of other consumers, the criteria and preferences set by other consumers, the criteria of other VOD channels created by the consumer, the criteria set for the current VOD channel (e.g., to remove or broaden one or more of the criteria), etc.

The playlist for a VOD channel is stored in a playlist database 250 by the orchestrator 220, and is used by the orchestrator 220 to create an EPG for the VOD channels. The EPG includes at least a portion of the playlist for each VOD channel is transmitted to the VOD client 210 to be stored locally to the consumer. In various aspects, because VOD content, unlike linear content, is not time-bound for delivery, the EPG for VOD channels will show the sequence of content items in the playlist. A more detailed discussion of an example EPG for VOD content is provided with respect to FIG. 4.

VOD content is encoded for transmission to consumers via the network and CDN 100 by the modulating encoder 224 of the physical network, which is controlled by the orchestrator 220. In various aspects, the modulating encoder 224 is a Quadrature Amplitude Modulator (QAM) or an OOK modulator used by the service provider to transmit linear and VOD content to consumers. Depending on the standard used for the physical network, a given frequency/wavelength, a given timeslot on a shared frequency/wavelength, or combinations thereof may be assigned for a given consumer to receive personalized VOD content. In one aspect, the incoming video signals from the source are frequency modulated in quadrature fashion before being transmitted to the consumers. Content may be unicast from the service provider to each consumer as IP packets to progressively cache the content item at various levels of the CDN 100 to reach the requesting consumer from which subsequent consumers who are downstream from a given caching point may request the same content item to be transmitted as a unicast to their premises, thus increasing the responsiveness of the network and reducing the bandwidth needed for transmissions.

In aspects where VOD channels are customized, each consumer will receive a stream of IP packets with a requested VOD channel's contents as the payload on a single frequency/wavelength assigned to that consumer. In aspects where default or pre-configured VOD channels are requested from a provider, each pre-configured VOD channel may be transmitted via separate frequencies/wavelengths assigned to those channels. Although each consumer's VOD client 210 is tuned to the associated consumer's or channel's assigned frequency/wavelength, each of the streams may be encrypted to prevent other consumers from accessing content for which they have not been granted access. When the consumer is not entitled to access to the requested content, the payloads may be scrambled, empty, or replaced with content that the consumer is entitled to access.

When the consumer is assigned a frequency/wavelength and sends a request for different content, the consumer stays tuned to the assigned frequency/wavelength and the head-end 110 or local node 120 then tunes to the frequency/wavelength of a requested channel or retrieves the requested content item. The head-end 110 or local node 120 then encapsulates the content as the payload of a stream of IP packets, which are transmitted to the consumer on the consumer's assigned frequency/wavelength for the consumer to receive the requested content. The payloads of the IP packets may be cached by the VOD client 210 for later playback, in anticipation of trick play options, or played back upon receipt.

Figure 3:
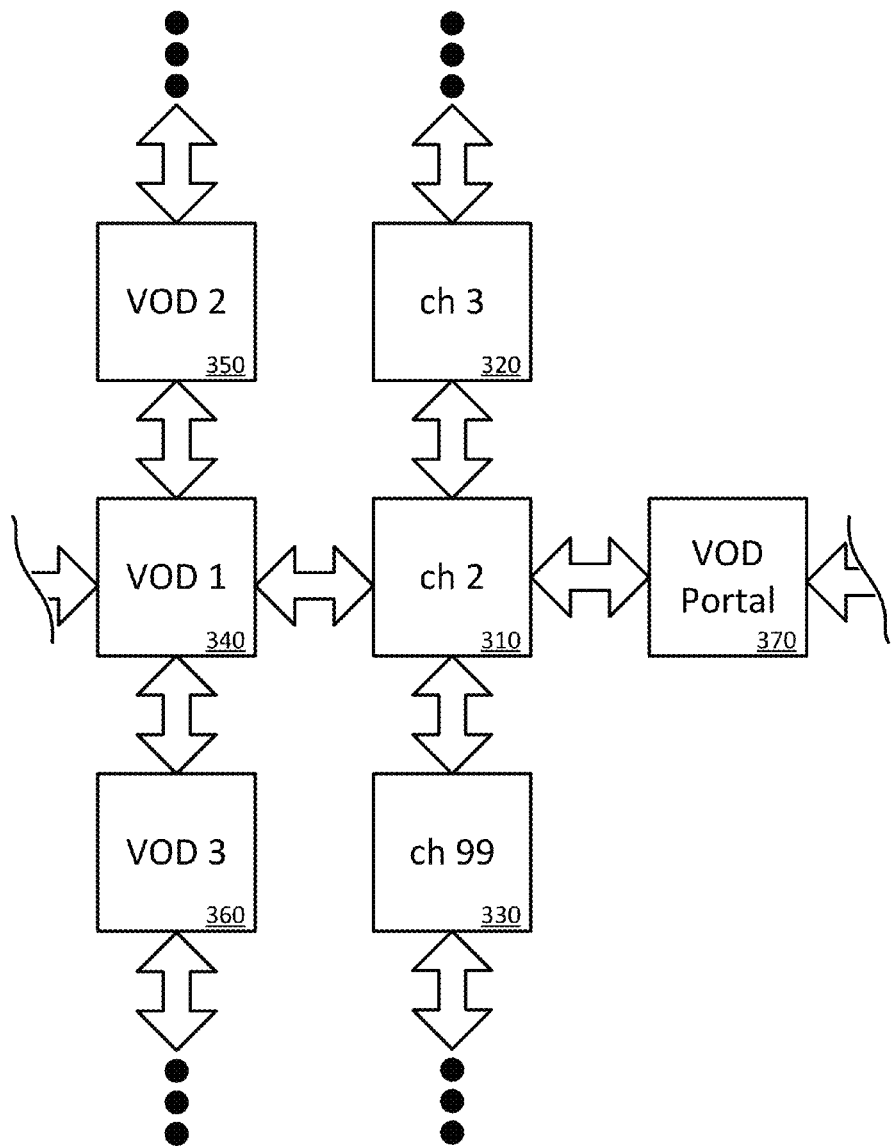
FIG. 3 is a block diagram illustrating an example separate navigation architecture for linear and Video On Demand channels.

FIG. 3 is a block diagram illustrating an example separate navigation architecture 300 for linear and VOD channels. In the separate navigation architecture 300, linear content is presented on linear channels and VOD content is presented on VOD channels, and a consumer may navigate each of the sets of channels, and between each set. A VOD portal 370 is also illustrated that is navigable from either set of channels from which the consumer may create additional VOD channels, edit existing VOD channels, or manually select VOD content from a menu-driven interface.

As illustrated, a current linear channel 310 is shown as being tuned to linear channel two. A consumer may navigate via directional navigation commands to a higher linear channel 320 via a channel up command and to a lower linear channel 330 via a channel down command. As will be understood, linear channels are arranged in a ring in a channel numbering scheme, such that any channel may be navigated to with sufficient directional commands in a single direction. For example, when channel two is the lowest channel and channel ninety-nine is the highest channel in the ring and the current linear channel 310 is tuned to channel two, channel ninety-nine may be navigated to via one "channel down" command (as it is the lower linear channel 330 to the current linear channel 310) or via a series of ninety-seven "channel up" commands.

Similarly, a current VOD channel 340 is shown as being tuned to VOD channel one. A consumer may navigate via directional navigation commands to a higher VOD channel 350 via a channel up command and to a lower VOD channel 360 via a channel down command. VOD channels, like linear channels, are arranged in a ring and are navigable as such so that directional navigation between VOD channels adjacent in the numbering scheme is enabled via channel up and channel down commands.

In a separate navigation architecture 300, each ring of channels (i.e., a channel lineup navigable in a circular fashion) is independently navigable. A consumer may navigate between each ring via a "band switch" command or a "tune-to" command specifying a channel in the other ring. For example, a consumer tuned to the current linear channel 310 who submits a "band switch" command will be tuned to the current VOD channel 340, and vice versa. Once tuned to a new ring of channels, the directional commands will tune the consumer to the high channel or lower channel in that ring. In various aspects, the ring of channels may themselves be organized in a ring so that a consumer may navigate them via "band up" or "band down" commands between rings, or each ring must be distinctly navigated to, such as, for example, via a dedicated command for "tune-to VOD channels," "tune-to linear channels," "tune-to menu system", "tune to EPG", etc. Individual channels may also be tuned to across rings via "tune-to" commands from an EPG selection of the channel or via an input of the channel designator, such as, for example, when a consumer inputs a channel number via a remote control. For example, linear channel two may be navigated to by a consumer pressing a "2" button on a remote control, whereas VOD channel two may be navigated to by a consumer pressing a button combination of, for example, "*-2" or "VOD-2," to indicate that the desired channel to tune to is a VOD channel of the designated number.

Alternatively, in a mutual navigation architecture, the VOD channels are added to the list of linear channels and may be navigated to via directional navigation commands. For example, when a consumer has ninety-nine linear channels and a VOD channel. The VOD channel may be indexed as though it were linear channel one-hundred. A consumer would then be enabled to directly navigate to the VOD channel by submitting a "tune-to channel one-hundred" command.

In aspects not using Picture-in-Picture (PIP) or video mosaics, only one channel is provided as the active channel on the endpoint device 132. For example, when the consumer is tuned to the current linear channel 310 as the active channel, the endpoint device 132 will display the content on the current linear channel 310, but not the VOD portal 370 or the current VOD channel 340. When the active channel is not the current VOD channel 340, the VOD content item on that channel will not be provided to the consumer. Navigating away from the current VOD channel 340 (e.g., to a different VOD channel or a linear channel) acts as a pause command, so that when the active channel is again the current VOD channel 340, the service provider will resume providing the consumer with the content item as it was last viewed by the consumer. In various aspects, the service provider may adjust the time at which the content item is provided to the consumer, for example, by five seconds prior to the last viewed playback, to reduce consumer disorientation when playback resumes.

It will be understood, however, that multiple channels may be provided to the consumer simultaneously, such as, for example, in a PIP display, in which multiple tuners are used to receive channels carried at different frequencies for simultaneous display, or in a mosaic display, in which the service provider combines content from multiple channels into a single content item. Those channels may include linear channels, VOD channels, the VOD portal 370, and other interface channels provided by the service provider.

Figure 4:
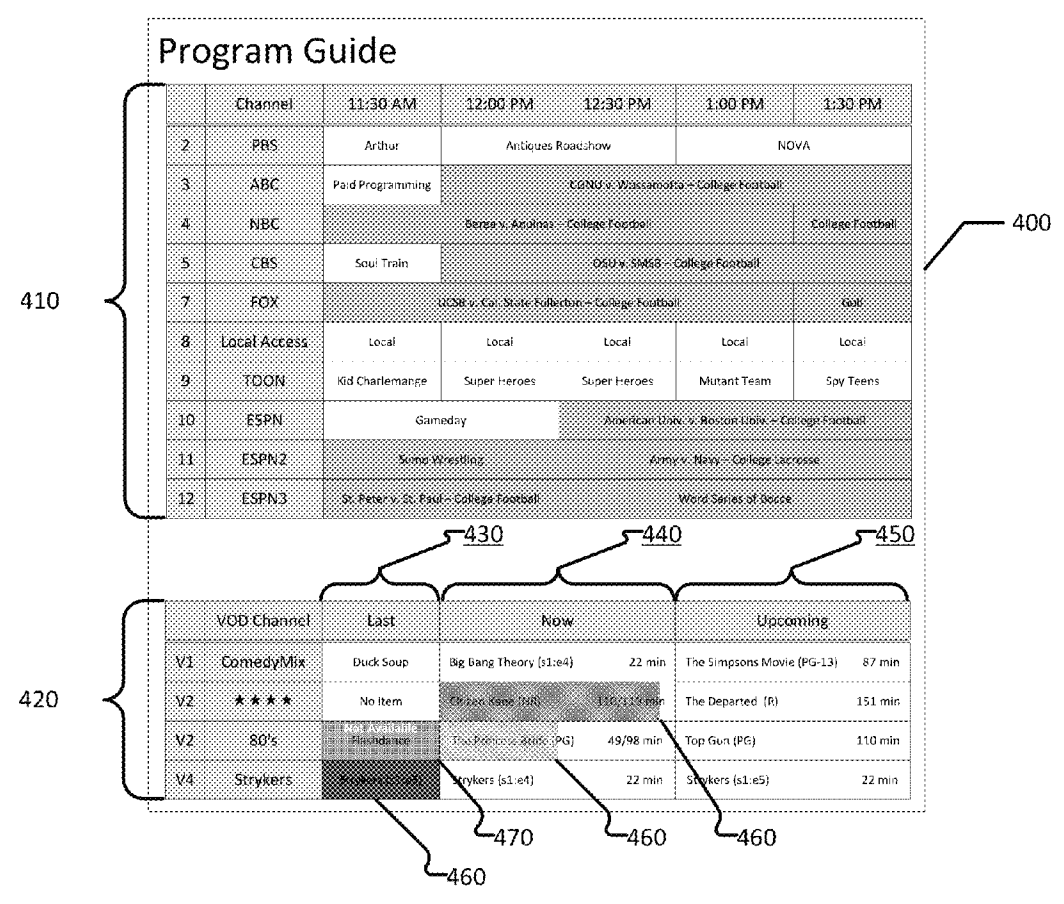

FIG. 4 is a block diagram illustrating an example EPG navigation architecture 400 for linear and VOD channels. Both a linear EPG layout 410 and a VOD EPG layout 420 are illustrated, and these layouts may be presented together or separately. For example, when a consumer calls for an EPG, both the linear EPG layout 410 and a VOD EPG layout 420 may be displayed simultaneously, or only one of linear EPG layout 410 and a VOD EPG layout 420 may be displayed. When only one layout is displayed, it may be called for specifically by the consumer (e.g., a "display VOD EPG" command) or based on the active channel (e.g., when the active channel is a VOD channel, the VOD EPG will be displayed). In various aspects, the EPG is created by the VOD client 210 or by the channel manager 222 and transmitted to the VOD client 210 based on the playlists for the VOD channels.

As illustrated, each of the linear EPG layout 410 and the VOD EPG layout 420 display several channels arranged in rows and the associated content items for those channels organized in columns, although in an alternative arrangement, columns and rows may be switched. The columns for the linear EPG layout 410 are organized according to blocks of time in which content items are scheduled to play. The columns for the VOD EPG layout 420, however, are organized according to a play order, because the time of delivery for VOD content is set by the consumer's request for that VOD content, not by a schedule. The displayed content items may be color coded to distinguish content types and may include relevant metadata about the content item (e.g., title, running time, content rating, critical rating, synopsis). As will be appreciated, various aspects of a linear EPG layout 410 or a VOD EPG layout 420 may include more or fewer channels and more or fewer content items per channel than the illustrated examples in FIG. 4.

In the VOD EPG layout 420, each channel is shown as including a prior-presented content item 430, a currently-presented content item 440, and an upcoming content item 450. Because VOD content is not presented to a consumer until it is requested, the currently-presented content item 440 is the content item that will be presented to the consumer when the consumer tunes to the VOD channel with which it is associated. The currently-presented content item 440 is replaced with the next-to-be presented content item 440 when it has been fully viewed, skipped, manually dismissed by the consumer, or automatically dismissed by the service provider when the content item is no longer available for presentation to the consumer.

The upcoming content item 450 is a content item (or items) that are listed for subsequent playback after the currently-displayed content item 440 has been fully viewed, skipped, removed by the consumer, or removed by the system. Unlike linear content items, which are transmitted at a scheduled time regardless of whether they have been watched, a next-to-be-presented content item 440 may remain the next-to-be-presented content item 440 until it becomes the currently-presented content item 440, is manually removed by a consumer, or automatically removed by the service provider when the content item is no longer available for presentation to the consumer.

The prior-presented content item 430 is the content item that was presented before the currently-presented content item 440. In various aspects, more than one, or no prior-presented content items 430 may be displayed for each VOD channel. When no content items have been previously presented, such as when a VOD channel is first created, a placeholder for the prior-presented content item 430 may be displayed in the VOD EPG.

In various aspects, an EPG is navigable by the consumer to select a channel to which to tune, for example, via a touch screen, a keyboard, a mouse, or the navigation keys of a remote control device. In a VOD EPG layout 420, in addition to channels, individual content items may be selected to request that content item from the service provider. When a content item is selected, the consumer may receive the content item as an entry point to the VOD channel's stream of content items. Alternatively, the consumer may also choose to receive the selected content item a la carte, such that a subsequent content item is not automatically provided to the consumer at the conclusion of the selected content item. As will be appreciated, when the consumer selects a prior content item 430 or an upcoming content 450, the selected content item becomes the currently-presented content item 440 and the order of playback is adjusted accordingly. In various aspects, the previous currently-presented content item 440 may be shifted to be the next upcoming content item 450, dropped from the VOD channel, or be shifted to be the prior-presented content item 430.

Because VOD content is delivered at the consumer's request, when the consumer navigates away from a VOD content item its playback does not continue. Therefore, the VOD EPG layout 420 may include viewing status indicators 460 for each content item. A viewing status indicator 460 shows how far along in a content item a consumer has progressed, which corresponds to a bookmark for the last viewed time of playback for that content item. The last viewed playback time may correspond to the start time of a content item, a time at which a consumer navigated away from a content item, and a time at which a network interface device 131 or an endpoint device 132 is turned off. In various aspects, a color shift, progress bar overlay (horizontal, vertical, mono-directional, bi-directional, etc.), status pie chart, counter (percentage or time), and combinations thereof may be used as a viewing status indicator 460.

When a content item is no longer available to the consumer, such as, for example, when it has been removed from the service provider's content server 240, or the consumer no longer is entitled access to the content item, the content item may be removed from the playlist for the VOD channel and removed from display in the VOD EPG layout 420. Alternatively, an unavailability indicator 470 may be displayed with the now-unavailable content item so that the consumer will know what content items were included in the VOD channel's playlist. In some aspects, a consumer may select the unavailability indicator 470 to be presented with a dialog that explains why the content item is now unavailable and whether the consumer may purchase the content item to be made available again or selected a different version of the item (e.g., a lower resolution version).

Figure 5:
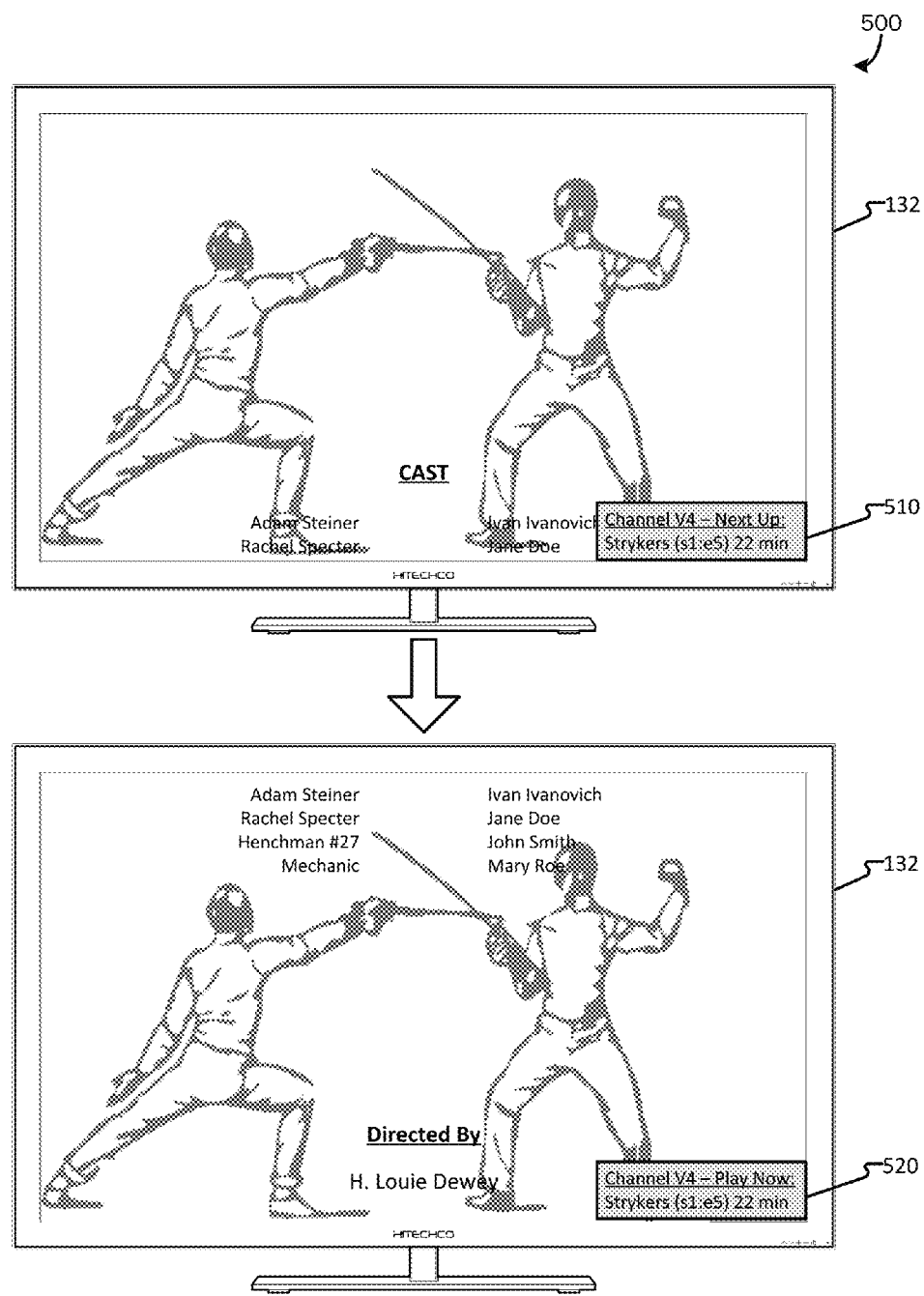
FIG. 5 illustrates an example of a content crossover for a Video On Demand channel.

FIG. 5 illustrates an example of a content crossover 500 for a VOD channel. As illustrated, an endpoint device 132 of a television is displaying the end of a content item carried on a given VOD channel. A tuning overlay 510 and a notification overlay 520 are also illustrated, which include information about the next VOD content item to be presented via the current VOD channel. The tuning overlay 510 is presented during the display period of a content item presented on a VOD channel to enable the consumer to navigate which content item will be next presented via that VOD channel. The notification overlay 520 is presented during a ready period, between the display period and the end of the content item, to alert the consumer that the content item displayed by the tuning overlay 510 is ready to be tuned to without buffering. The service provider may reduce the amount of data sent over the network and cached by the CDN 100 and increase its responsiveness to consumer commands by varying the duration of the display and conclusion periods and the effects of navigation commands transmitted during those periods.

The display period enables the service provider to reduce the amount of data transmitted over the network (and cached by CDN 100) by prompting a consumer to respond whether the next content item is of interest before the content item indicated in the tuning overlay 510 is transmitted to, and cached by, the VOD client 210. In such aspects, the display period is offset from the end of the content item by an amount of time equal to or greater than the playback time of the cache of the VOD client 210. During the display period, the service provider adjusts how it interprets a "jump to next content item" command to affect the upcoming content item 450 displayed in the tuning overlay 510 rather than affecting the currently-presented content item 440. For example, outside of the display period, a "jump to next content item" command will advance the currently-presented content item 440 to the upcoming content item 450. However, when the display period begins and the tuning overlay 510 is displayed, a "jump to next content item" command will leave the currently-presented content item 440 playing, but instead advance the upcoming content item 450 displayed in the tuning overlay 510 to the subsequent upcoming content item 450. For example, when a consumer is watching episode four of a television series being presented sequentially over the VOD channel, a "jump to next content item" command will cause episode five to be presented unless the command is received during the display period, in which case the upcoming content item 450 will advance from episode five to episode six and the tuning overlay 510 will be updated accordingly.

The ready period, in which the notification overlay 520 is displayed, enables the service provider to increase the perceived responsiveness of the network and CDN 100 to consumer commands. The presence of the notification overlay 520 signals to the consumer that the upcoming content item 450 can be provided without the need to buffer content. The ready period begins once a sufficient portion of the upcoming content item 450 has been cached by a VOD client 210 to provide the consumer with the requested content item on command without buffering. Although the ready period begins after the display period is complete, in various aspects, a gap exists between the display period and the ready period so that the VOD client 210 has enough of the upcoming content item 450 cached so that no buffering is required when the consumer submits a "jump to next content item" command. In various aspects, the playback time of a content item that is to be cached before the ready period begins is equal to or greater than the amount of time it takes for a signal to be sent from the VOD client 210 to the orchestrator 220 and for a signal to be returned from the orchestrator 220 to the VOD client 210. For example, when signals traveling between the VOD client 210 and the orchestrator require x seconds of travel and processing time (round trip), and a cache of a VOD client 210 receives content in segments comprising less than x seconds of playback, a gap will exist between the display period and the ready period in which the VOD client 210 has cached some, but less than x seconds, of the upcoming content item 450. The ready period lasts until the upcoming content item 450 begins playback, and becomes the currently-presented content item 440.

In various aspects, the tuning overlay 510 and notification overlay 520 are generated by either the VOD client 210 or the orchestrator 220. When the VOD client 210 generates the tuning overlay 510, the tuning overlay 510 is constructed with data from a locally stored EPG on the upcoming content item 450 and displayed on a separate layer from the currently-presented content item 440. When the orchestrator generates the tuning overlay 510, it is constructed with data from an EPG or a VOD channel playlist and may be transmitted for display on a separate layer from the currently-presented content item 440 or integrated into the currently-presented content item 440 for display by the consumer. In aspects where the tuning overlay 510 and notification overlay 520 are generated by the VOD client 210, the overlays are updated before the service provider is alerted to the change in the upcoming content item 450.

Although the tuning overlay 510 and notification overlay 520 are illustrated in the bottom right corner of the content item in FIG. 5, one of skill in the art will recognize that the overlays may be located in other positions relative to a content item (e.g., the upper left corner, centered) to vary its impact on the display of other overlays (e.g., an onscreen EPG, a channel indicator, a volume indicator) and the content being presented.

Figure 6:
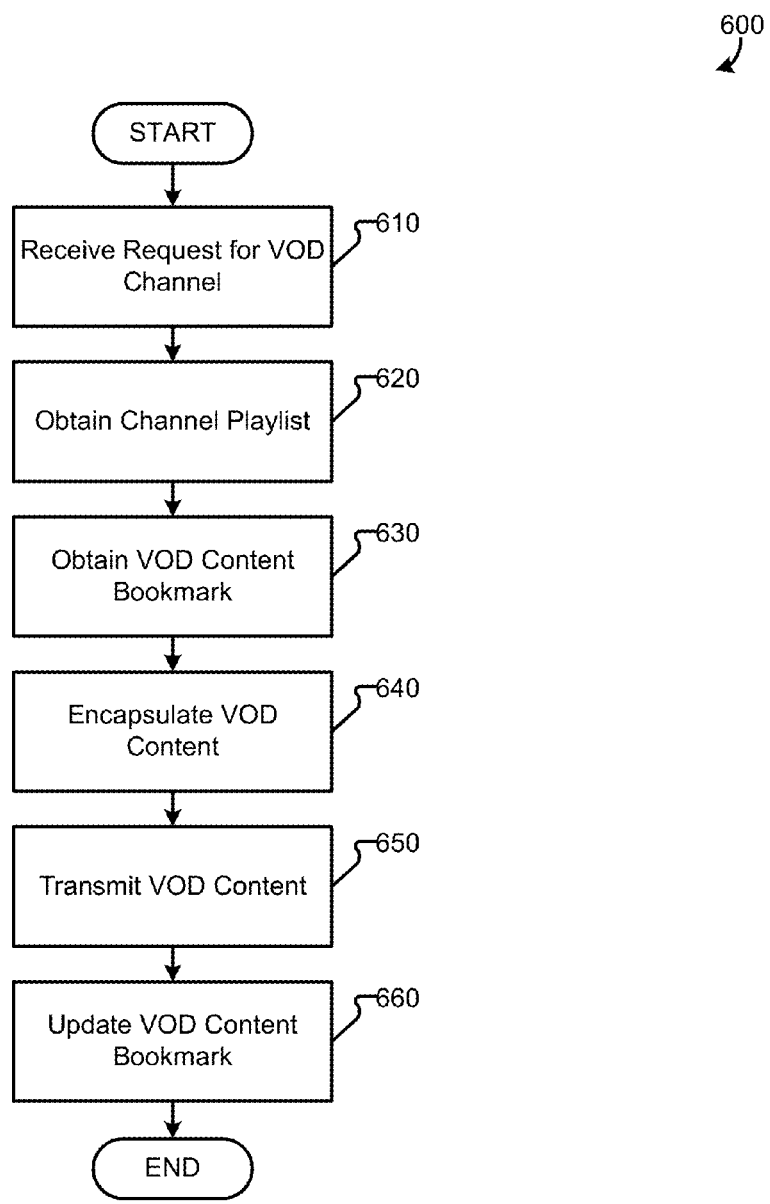
FIG. 6 is a flowchart illustrating general stages in an example method for a service provider to provide personalized Video On Demand channels to consumers.

FIG. 6 is a flowchart illustrating general stages in an example method 600 for a service provider to provide personalized VOD channels to consumers. Method 600 begins at operation 610 when the service provider receives a request for a VOD channel from a consumer. In various aspects, the service provider may receive the selection at a head-end 110 or a local node 120.

The selection of a VOD channel identifies the consumer requesting the VOD channel and the channel being requested by the consumer. For example, the consumer may be identified by a subscriber account number, a media access control (MAC) address associated with a requesting device, an IP address associated with a requesting device, or similar unique identifier. Example channel identifiers include channel numbers (e.g., VOD channel one) and customized names given by consumers to those channels (e.g., "Comedy," "Four Stars," "Strykers"). Because the channel identifier is received along with the identifier for the requesting consumer, multiple consumers may use the same channel identifier to request different VOD channels. For example, a first consumer may set up VOD channel one for comedy television shows, whereas a second consumer may set up VOD channel one for dramatic movies, and when each consumer requests VOD channel one, each will be provided with their personalized VOD channel one, not the other consumer's VOD channel one. In several aspects, the request of a VOD channel requires less data to be transmitted to the service provider than a request for a particular VOD content item, which requires both a consumer identifier and a content item identifier.

When the service provider has received the request of a VOD channel, method 600 proceeds to operation 620, where the service provider obtains the playlist for the requested VOD channel. The playlist is stored in a playlist database 250 and is built from VOD content items according to consumer-set criteria and preference. In various aspects, the playlist is ordered according the consumer-set preferences. Method 600 proceeds to operation 630 where a content bookmark is retrieved to indicate which VOD content item in the playlist, and when in that VOD content item, playback should begin for the consumer. For example, in a playlist comprising all the episodes of a television series, to be played in sequential order by consumer preference, bookmarks indicate that the consumer has viewed the first three episodes and five minutes of the fourth episode. The service provider may use the bookmark from the example to provide the consumer with the fourth episode starting at the fifth minute, so that the consumer is not presented with already-watched VOD content.

At operation 640 the service provider encapsulates the VOD content, starting at the time indicated by the bookmark. The content item is segmented into and encapsulated into packets. As will be understood, packets include a header, which comprises data that identifies the contents, and a payload of the segment of the content item. In various aspects, packets may also include footers, located after the payload. The size of the payload may vary in different aspects, and the contents of headers and footers may vary depending on the standard used to encapsulate the segments of content. For example, the encapsulation may be done via Ethernet packets, such as those specified by the Institute of Electrical and Electronics Engineers (IEEE) 802.3-2012 standard, transport stream packets, such as those specified in the International Organization for Standardization (ISO) and International Electrotechnical Commission (IEC) 13818-1 standard, combinations thereof, and other formats capable of streaming media.

At OPERATION 650 the service provider transmits the VOD content to the consumer. The stream of packets into which the content item is encapsulated are multiplexed via QAM, OOK by a laser or laser diode for transmission over the fiber optic transmission media of the physical network. In various aspects, the content may be multiplexed according to wavelength/frequency division multiplexing, time division multiplexing, or a hybrid thereof and may be cached at various points managed by the CDN 100. When time division multiplexing is used, the packets transmitted to the consumer in response to a request for a new content item may be sent in a burst to fill the cache of the VOD client 210. As will be understood, burst transmission provides a higher-than-average bandwidth for a given consumer over a short period of time. For example, a consumer may receive data at up to x Mbit/s, but during a burst may receive data at 2x Mbit/s for y seconds. As will be understood, the exact increase of bandwidth and the duration of a burst are governed by the service provider and the size of the cache of the VOD client 210 and may vary with network conditions and the number of requests for different content.

Method 600 proceeds to operation 660, where the VOD content bookmark is updated. A bookmark may be updated actively, by the consumer, or passively, by the service provider. For example, when the bookmark is actively updated, the consumer may send a "set bookmark" command to the service provider including a timestamp in the VOD content item when the command is sent to convey the last viewed time for a content item to the service provider. A "set bookmark" command may be automatically sent by the VOD client 210 periodically (e.g., every half, one, two, etc., seconds), in response to a channel change command from a consumer, or manually sent in response to a consumer-initiated "bookmark" command. Commands to a network interface device 131 or an endpoint device 132 to turn off or to change band (e.g., switch to the DVD player or game console) may also automatically generate a "set bookmark" command. The timestamp carried by a "set bookmark" command updates the timestamp held by the orchestrator 220 so that the orchestrator 220 will know what the last-viewed time in a given VOD content item is for the consumer. In various aspects, the orchestrator 220 will adjust the timestamp to account for transmission delays and the portions of the VOD content item viewed during those transmission delays.

When the service provider passively updates the bookmark, it may update the bookmark based on the last time in the given VOD content item that was transmitted by the service provider. In various aspects, the service provider may adjust the last transmitted time in the bookmark backwards to account for transmission delays between the service provider and the consumer. For example, when a consumer indicates at 0:27:00.0 that the given content item is no longer desired (e.g., via a channel change command, "jump to next content item" command, an endpoint device 132 is turned off) and the transmission time is one second, the service provider will have already transmitted the 0:27:01.0 (hours:minutes:seconds) mark in the VOD content item to the consumer and will accordingly adjust the bookmarked time backward by one second because the transmitted portions in that one second period were not viewed by the consumer. The service provider may similarly adjust the time indicated in the bookmark from the last-transmitted time to account for cached content (and the playback thereof) during a transmission delay between the service provider and the consumer.

In various aspects, the bookmark may be set to a time in a given VOD content item other than the last-viewed or last-transmitted time. For example, a context offset of x seconds may be applied to the bookmark to provide the consumer with context from x seconds before the stated time in the bookmark. For example, when the bookmark is set for 1:03:27.5 in a movie, content may be provided starting from 1:03:26.0 (x=1.5) so that audio is not clipped and an appropriate video frame to start playback from is selected. For example, when the last-viewed or last-transmitted time corresponds to a predictive frame of the content item (e.g., a P-frame or a B-frame), the bookmark may instead by set its stated time the preceding intra-coded frame (i.e., an I-frame) to aid in interpreting the content item. One of ordinary skill in the art will understand the use of I-, P-, and B-frames in compressed video.

As will be appreciated, when all of a given VOD content item has been transmitted to or viewed by the consumer, the bookmark will be updated indicate the next VOD content item in the associated playlist for the VOD channel and the stated time in the bookmark will be the start time of the next VOD content item. In various aspects, such as when a consumer navigates back-and-forth between content items within a playlist, a bookmark may be stored for each VOD content item so that the consumer, when switching from a first VOD content item to a second VOD content item (or vice versa) will be able to resume playback of that VOD content item from when the consumer left off. Once the consumer finishes viewing the VOD content item, any bookmarks specific to that VOD content item may be deleted so that playback will begin at the start of the VOD content item when the consumer requests to view it again.

Method 600 may then conclude.

Figure 7:
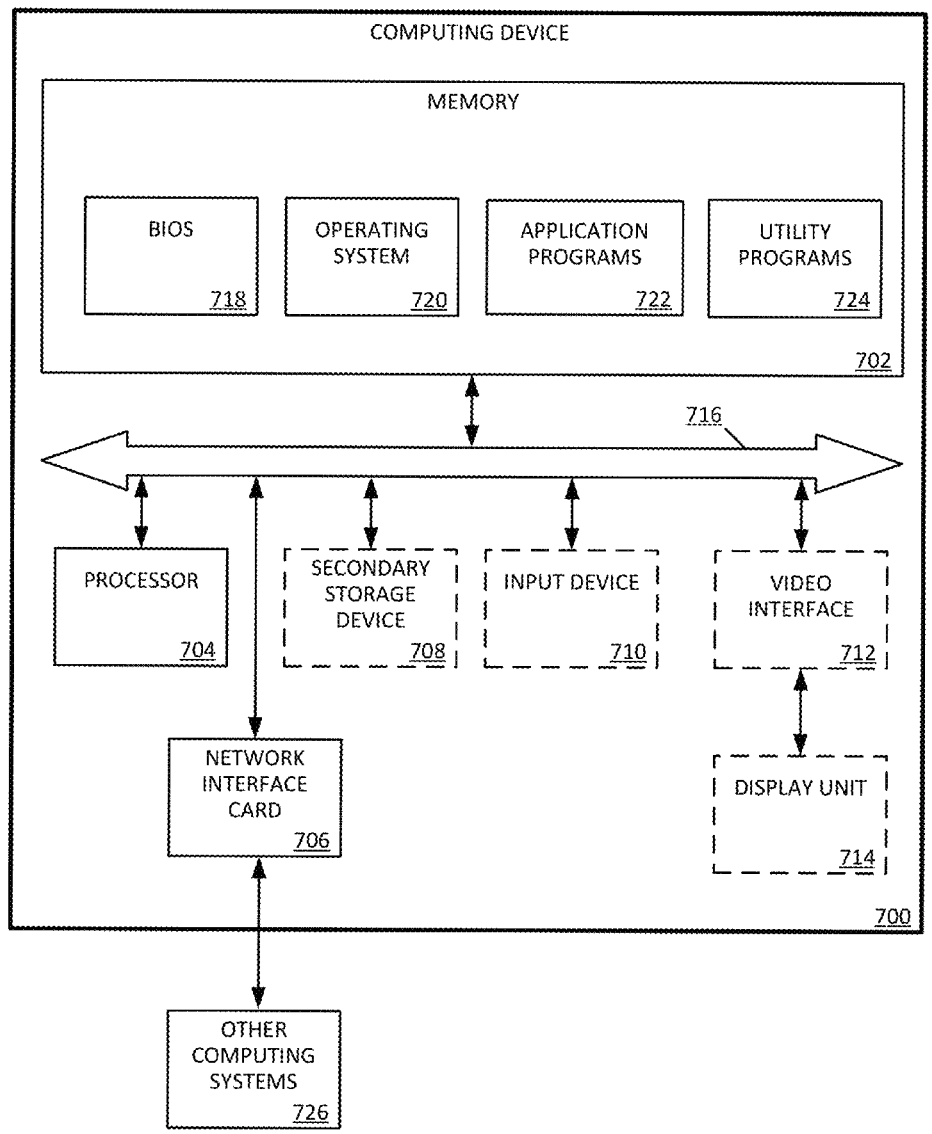
FIG. 7 is a block diagram illustrating example physical components of a computing device with which embodiments of the present disclosure may be practiced.

FIG. 7 is a block diagram illustrating example physical components of a computing device 700 with which embodiments of the present disclosure may be practiced. In some embodiments, one or a combination of the components of the VOD channel system 200 are implemented using one or more computing devices like the computing device 700. It should be appreciated that in other embodiments, one or a combination of the components of the VOD channel system 200 may be implemented using computing devices having hardware components other than those illustrated in the example of FIG. 7.

Computing devices may be implemented in different ways in different embodiments. For instance, in the example of FIG. 7, the computing device includes a memory 702, a processor 704, a network interface 706, an optional secondary storage device 708, an input device 710, a video interface 712, communicated with a display unit 714, and a communications medium 716. In other embodiments, the computing device 700 may be implemented using more or fewer hardware components or in combination with other types of computer systems and program modules.

The memory 702 includes one or more computer-readable storage media capable of storing data or computer-executable instructions that, when executed by processor 704, provide functionalities as described herein. In various embodiments, the memory 702 is implemented in various ways. For example, the memory 702 can be implemented as various types of computer-readable storage media to store various types of data or software instructions. For instance, in the example of FIG. 7, the memory 702 stores a Basic Input/Output System (BIOS) 718 and an operating system 720. The BIOS 718 includes a set of software instructions that, when executed by the processor 704, cause the computing device 700 to boot up. The operating system 720 includes a set of software instructions that, when executed by the processor 704, cause the computing device 700 to provide an operating system that coordinates the activities and sharing of resources of the computing device 700. The memory 702 also stores one or more application programs 722 that, when executed by the processing system 704, cause the computing device 700 to provide applications to users. The memory 702 also stores one or more utility programs 724 that, when executed by the processor 704, cause the computing device 700 to provide utilities to other software programs.

The optional secondary storage device 708 includes one or more computer-readable storage media, and may store data and computer-executable instructions not directly accessible by the processor 704. That is, the processor 704 performs an I/O operation to retrieve data or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, or other types of computer-readable storage media.

The processor 704 includes one or more processing units, which may include tangible integrated circuits that selectively execute computer-executable instructions. In various embodiments, the processing units in the processor 704 are implemented in various ways. For example, the processing units can be implemented as one or more processing cores. In another example, the processor 704 can comprise one or more separate microprocessors. In yet another example, the processor 704 can comprise Application-Specific Integrated Circuits (ASICs) that provide specific functionality. In yet another example, the processor 704 provides specific functionality by using an ASIC and by executing computer-executable instructions.

The computing device 700 may be enabled to send data to, and receive data from, a communication network via a network interface 706. In different embodiments, the network interface 706 is implemented in different ways, such as an Ethernet interface, a token-ring network interface, a fiber optic network interface, a wireless network interface (e.g., Wi-Fi, Wi-Max, etc.), or another type of network interface. The network interface 706 enables the computing device 700 to communicate with other computing systems 726, such as over a wireless network in a distributed computing environment, a satellite link, a cellular link, and comparable mechanisms. Other devices may include computer device(s) 700 that execute communication applications, storage servers, and comparable devices.

The optional input device 710 enables the computing device 700 to receive input from a user. Example types of input devices 710 include, but are not limited to: keyboards, mice, trackballs, stylus input devices, keypads, microphones, joysticks, touch-sensitive display screens, and other types of devices that provide user input to the computing device 700.

The optional video interface 712 outputs video information to an optional display unit 714. In different embodiments, the video interface 712 is implemented in different ways. For example, the video interface 712 may be a video expansion card. In another example, the video interface 712 is integrated into a motherboard of the computing device 700. In various aspects, the display unit 714 can be an LCD display panel, a touch-sensitive display panel, an LED screen, a projector, a cathode-ray tube display, or another type of visual display device. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processor 704, the network interface 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

Embodiments of the present disclosure may be used in various distributed computing environments where tasks are performed by remote processing devices that are linked through a communications network in a distributed computing environment.

Examples and aspects are described above with reference to block diagrams or operational illustrations of methods, systems, and devices. The functions/acts noted in the blocks may occur out of the order as shown in any flowchart or described herein with reference to FIG. 6. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

I claim:

1. A system for providing a consumer with channels comprising Video on Demand (VOD) content, the system comprising:
    a processor; and
    computer readable storage media including instructions, which when executed by the processor enable the system to provide:
        a VOD channel manager, operable to receive criteria and preferences from the consumer, wherein the criteria and preferences are used by the VOD channel manager to find VOD content having metadata meeting the criteria and preferences, wherein the found VOD content is organized into a plurality of playlists, and wherein each playlist of the plurality of playlists is associated with one VOD channel of a plurality of VOD channels, wherein each VOD channel includes a bookmark that indicates a given VOD content item in the associated playlist and a stated time in the given VOD content item corresponding to a last-viewed time by the consumer of the given VOD content item, wherein each VOD channel has relationships set by the VOD channel manager to a higher VOD channel and a lower VOD channel within the plurality of VOD channels; and
        a multiplexing encoder, operable to encode the VOD content onto a content delivery network for transmission to the consumer, wherein the VOD content encoded is selected from the associated playlist of a current VOD channel according to the bookmark when the consumer has transmitted a request for the current VOD channel via a navigation command, wherein the system:
            adjusts a timestamp associated with the bookmark to account for:
                transmission delays associated with a VOD client; and
                a cache size of the VOD client, wherein the system further uses navigation commands that include:
            a channel up command, specifying that the higher VOD channel of a previous VOD channel of the plurality of VOD channels is requested as the current VOD channel; and
            a channel down command, specifying that the lower VOD channel of the previous VOD channel of the plurality of VOD channels is requested as the current VOD channel.

2. The system of claim 1, wherein the multiplexing encoder uses Quadrature Amplitude Modulation to multiplex the VOD content onto a wavelength assigned to the consumer by a service provider.

3. The system of claim 1, wherein the VOD channel manager is further operable to:
    update the bookmark as VOD content is transmitted to the consumer to reflect the last transmitted time in the given VOD content item.

4. The system of claim 1, wherein the navigation commands further include:
    a tune-to command, specifying by a VOD channel number that a given VOD channel corresponding to the VOD channel number is requested as the current VOD channel; and
    a trick play command, specifying a trick play mode to apply to the current VOD channel.

5. The system of claim 1, wherein the VOD channel manager is operable to produce an Electronic Programming Guide (EPG) by which the playlist of VOD content comprising each VOD channel is visually displayed on an endpoint device when transmitted to the consumer.

6. The system of claim 5, wherein the EPG displays viewing status indicators for each VOD content item displayed in the EPG, wherein the viewing status indicators visually show where in each VOD content item the consumer has progressed in viewing according to the bookmark.

7. A method for providing a consumer with channels comprising video on demand (VOD) content, the method comprising:

receiving criteria and preferences for VOD content from the consumer via a Hybrid Fiber-Coaxial (HFC) network;
creating a playlist comprising VOD content matching the criteria and preferences for VOD content;
associating the playlist with a VOD channel;
receiving a request for the VOD channel;
obtaining the playlist associated with the VOD channel;
obtaining a VOD content bookmark, wherein the VOD content bookmark indicates a given VOD content item in the playlist and a stated time in the given VOD content item indicating a last-viewed time of the given VOD content item by the consumer;
adjusting a timestamp associated with the VOD content bookmark to account for:
  transmission delays associated with a VOD client; and
  a cache size of the VOD client;
encapsulating the given VOD content item beginning at the stated time from the VOD content bookmark; and
transmitting, via a multiplexing encoder, the encapsulated given VOD content item to the consumer via the HFC network.

8. The method of claim 7, further comprising:
actively updating the VOD content bookmark, wherein the stated time of the VOD content bookmark reflects a timestamp indicated in a set-bookmark command received from the consumer indicating the last-viewed time that the consumer received the given VOD content item.

9. The method of claim 7, further comprising:
passively updating the VOD content bookmark, wherein the stated time of the VOD content bookmark reflects a last-transmitted time in the given VOD content item at which the given VOD content item was transmitted to the consumer.

10. The method of claim 7, wherein the VOD channel is navigable as part of a ring of linear content channels, wherein the VOD channel is assigned a channel number as part of a numbering scheme for the linear content channels.

11. The method of claim 7, wherein a plurality of playlists are associated with a corresponding plurality of VOD channels, further comprising:
receiving a navigation command from the consumer;
setting a new VOD channel from the plurality of VOD channels, based on the navigation command, as an active VOD channel from which VOD content will be provided to the consumer;
obtaining a new VOD content bookmark, wherein the new VOD content bookmark indicates a new VOD content item in the playlist associated with the active VOD channel and a new stated time in the new VOD content item;
encapsulating the new VOD content item beginning at the new stated time from the new VOD content bookmark; and
transmitting the encapsulated new VOD content item to the consumer via the HFC network.

12. The method of claim 11, further comprising:
receiving a new navigation command from the consumer indicating navigation back to the VOD channel;
setting the VOD channel as the active VOD channel; and
obtaining the VOD content bookmark.

13. The method of claim 7, further comprising:
receiving a trick play command from the consumer to perform on the given VOD content item; and
adjusting the VOD content bookmark according to the trick play command.

14. A system for providing a consumer with channels comprising Video on Demand (VOD) content, the system comprising:
a VOD client operable to receive commands, criteria, and preferences from the consumer;
an orchestrator that includes a multiplexing encoder, in communication remotely with the VOD client via a content delivery network, the orchestrator to:
  receive the criteria and preferences from the VOD client to create a VOD channel comprising a playlist of VOD content meeting the criteria and the preferences of the consumer;
  encode, via the multiplexing encoder, the VOD content onto the content delivery network for transmission;
  transmit the VOD content according to a bookmark to the VOD client in response to receiving a navigation command from the VOD client specifying the VOD channel, wherein the bookmark indicates a given VOD content item in the playlist of VOD content and a stated time in the given VOD content item from which the orchestrator transmits the given VOD content item to the consumer, wherein the stated time corresponds to a time in the given VOD content item at which the consumer last viewed the given VOD content item; and
  adjust a timestamp associated with the bookmark to account for:
    transmission delays associated with the VOD client; and
    a cache size of the VOD client.

15. The system of claim 14, wherein the navigation command is a directional command received while the VOD client is receiving content from a first VOD channel that causes the VOD client to request a second VOD channel from the orchestrator, wherein the first VOD channel is adjacent to the second VOD channel in a VOD channel numbering scheme.

16. The system of claim 14, wherein the navigation command is a tune-to command, wherein the tune-to command specifies a specific VOD channel by channel number, that causes the VOD client to request the specific VOD channel from the orchestrator.

17. The system of claim 14, wherein the navigation command is a band-change command, wherein, prior to receiving the navigation command, the VOD client was not receiving VOD content.

18. The system of claim 14, wherein the navigation command is for navigation within the playlist of VOD content comprising the VOD channel from which the VOD client is currently receiving content, wherein the navigation command causes the VOD client to request, from the orchestrator, a different VOD content item from the playlist of VOD content.

19. The system of claim 14, wherein the orchestrator is further operable to create an electronic programming guide (EPG) comprising a visually displayed ordering for which the playlist of VOD content comprising each VOD channel created for a given VOD client, wherein the orchestrator transmits the EPG to the given VOD client for display on an endpoint device.

20. The system of claim 19, wherein the navigation command is an EPG command that selects one of the VOD channels displayed in the EPG.

* * * * *